April 3, 1934.  C. C. ALLEN ET AL  1,953,738
EYE TESTING INSTRUMENT
Filed Nov. 21, 1931  5 Sheets-Sheet 4

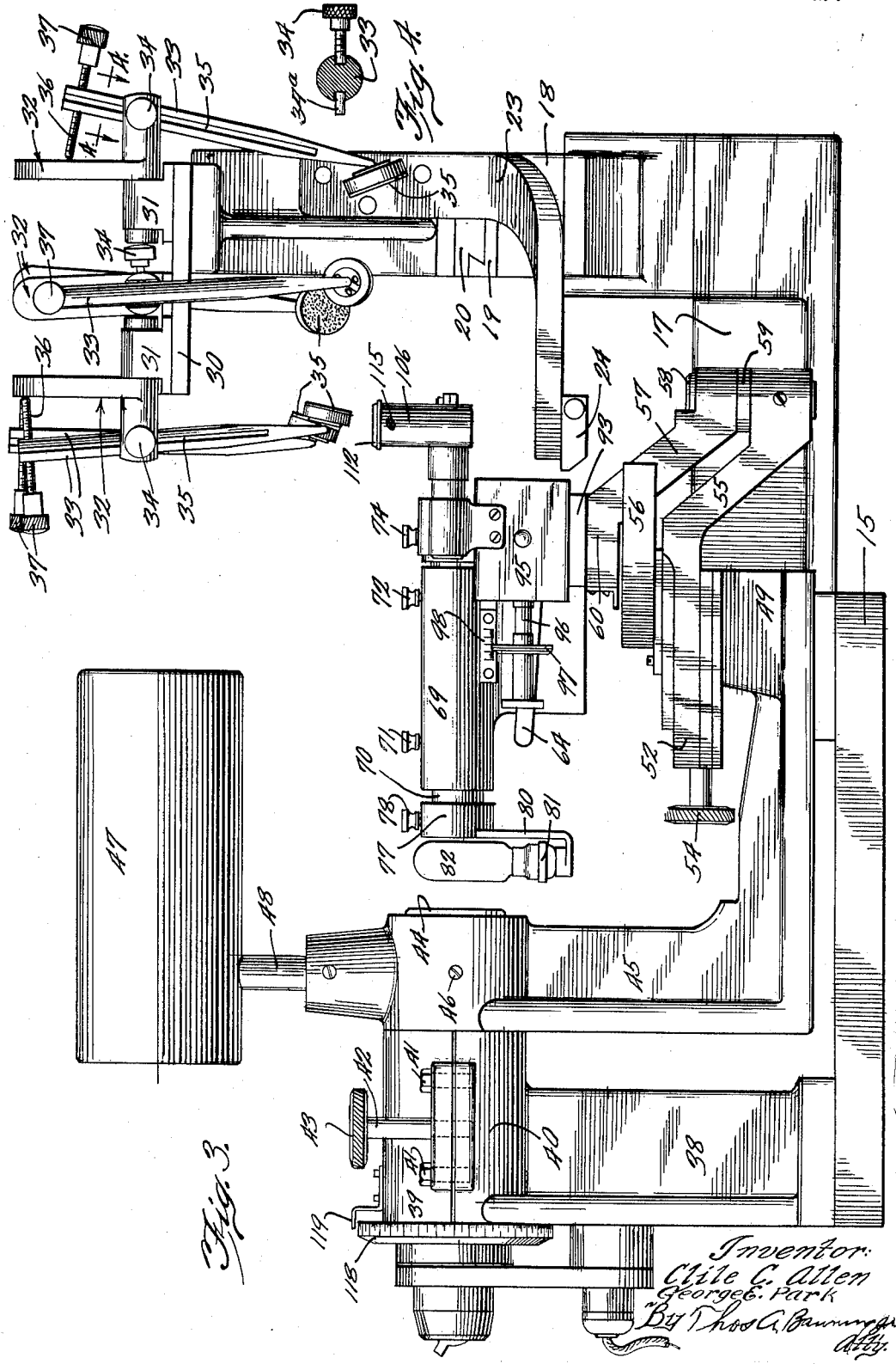

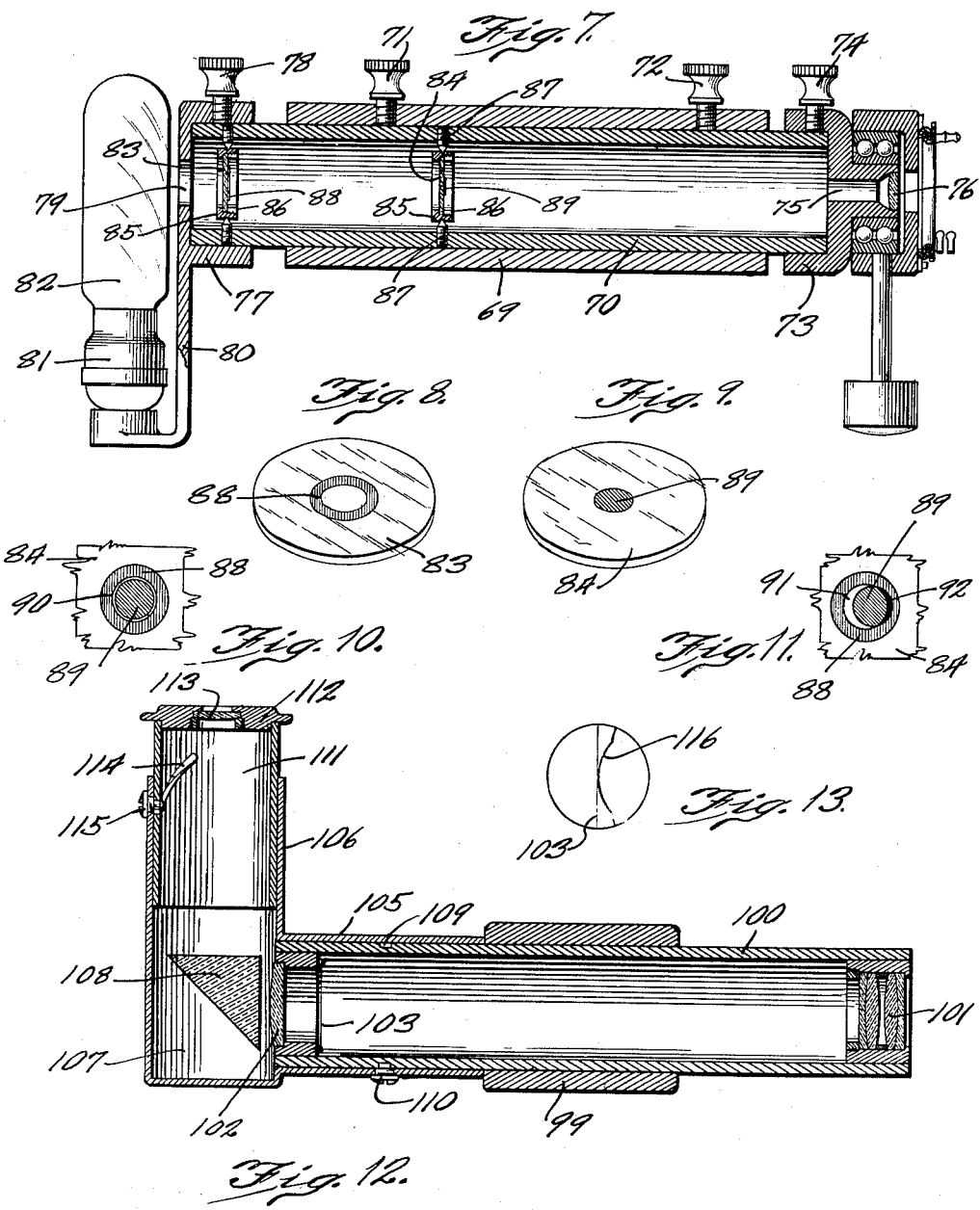

UNITED STATES PATENT OFFICE 1,953,738

EYE TESTING INSTRUMENT

Clile C. Allen and George E. Park, Chicago, Ill.

Application November 21, 1931, Serial No. 576,572

14 Claims. (Cl. 88—20).

This invention has to do with certain improvements in instruments for testing the human eye. The tests which the present instrument is intended to perform are for the purpose of exactly ascertaining the center of motion of the eye during its excursions. The human eye in these movements rotates about a center which is located within its body, and the physical position of this center within the body of the eye ball also changes as the eye moves a greater or less amount away from a direct forward line of sight. Generally speaking, the position of the center of motion lies somewhat towards the nose with respect to the visual axis and to the rear of the geometric center of the eye ball.

The position of the center of motion also varies in a different manner when the eye is caused to move in such a manner that the visual axis lies within a plane which is tilted with respect to the medial plane of the patient's eyes.

A determination of the exact center of motion, and especially a determination of the manner in which the position of the center of motion varies as the visual axis departs more and more from a direct forward line of vision is especially important and necessary for a predetermination of the amount and kind of operation on the muscles necessary to correct for strabismus or crossed eye.

The correction of the muscles in order to correct for strabismus depends upon an accurate knowledge of the eye ball movement and this in turn requires test and determination of movement of the eyeball under control of the muscles.

For this reason an exact determination of this eyeball movement is highly important for the purpose of insuring accurate results in operations of this nature.

The variations in movement of the eyeball during lateral excursions of the eye also include back and forth movements of the eyeball within its socket. It has been ascertained that as the eye is turned templeward the eyeball recedes within its socket, whereas during movements of the eye nasalward, the eyeball is projected a greater extent from the socket; and these bodily movements of the eyeball back and forth within its socket also influence the nature of the correction of the muscles which should be made in order to correct for strabismus. These back and forth movements of the ball in its socket may also be expressed as a receding or advancing of the corneal vertex.

The variations above referred to are quite small in amount, being of the nature of millimetres and tenths of millimetres; and therefore an instrument to measure these variations with sufficient accuracy to be of practical value must be of such a nature as to enable very accurate measurement of the several varying factors which include the visual axis, the direction of vision, (including the angle, if any, of departure from the medial plane, as well as the angular amount of the excursion), and the exact position of the corneal vertex with respect to its position for direct forward sight. Upon gaining information as to the position and direction of the visual axis in comparison to the position of the corneal vertex for different angles of test there is made available a fund of information from which the variations of position of the center of motion can be ascertained.

It is therefore an object of the invention to provide an instrument which is so constituted that the indications necessary for ascertaining the measurements under different conditions will be very accurately given. One of these indications relates to the direction of the visual axis of the eye under test. A very slight divergence or inaccuracy in this direction will result in an error of substantial amount. We have therefore provided an arrangement whereby the indication of the direction of this axis will be very accurately given in comparison to a scale of known directions.

More specifically, this feature of the invention relates to the provision of a viewing tube whose direction can be changed from time to time and whose direction is shown on a convenient indicating scale; this viewing tube being provided with a pair of sights or screens located at different positions on its axis. One of said sights is provided with a ring or annulus of substantially monochromatic color, for example red, and the other sight is provided with a central spot or circle of complementary color, for example green, both said annulus and said spot being transparent or translucent and capable of transmitting light of the respective monochromatic colors; and said annulus and said spot are of such sizes that, when viewed by the patient along the axis of the viewing tube, there appears a narrow ring of white light between the annulus and spot of the sights, whereas, when the visual axis of the eye under test does not coincide with the axis of the viewing tube, said annulus and spot are relatively eclipsed so that said ring of white light appears as a crescent of white light. The appearance of this crescent is greatly emphasized and exaggerated due to the fact that the colors at the sides thereof are complementary and therefore show black where superimposed.

When using this viewing tube arrangement, it is a simple and accurate matter for the patient to notify the person adjusting the instrument at the instant when the white ring appears as a perfect circle whereupon there is certainty that the visual axis of the eye under test coincides with the optical axis of the viewing tube.

In connection with the foregoing, we have also made provision for ascertaining the exact position of the corneal vertex after coincidence of the visual axis of the eye with the optical axis of the viewing tube has been established as above explained. This means for ascertaining the position of the corneal vertex consists in a microscope placed with its axis at right angles to the optical axis of the viewing tube. Said microscope is conveniently provided with a straight hair or wire located at the eye piece thereof. Said viewing tube and said microscope are located upon a member which swings about a pinion, the angular amount of said swing being shown upon an arc segment, graduated from zero at its centre to each end; the centre of generation of the arc segment lying upon the axis of said pinion. Said microscope is so constructed that an image of the corneal vertex is formed at the plane of the straight hair or wire of exactly the same dimensions as the corneal vertex when said visual axis of the eye coincides with the optical axis of said viewing tube. It will be seen that any movement of the corneal vertex along the optical axis of the viewing tube results in a movement of equal amount of its image across the axis of the microscope. As said hair or wire intersects the axis of said microscope and is perpendicular thereto, it will be seen that any movement of the microscope necessary to bring said hair or wire into tangency with the image of the corneal vertex will be a measure of the difference between the positions of the corneal vertex at two different instants. This we have provided in a slide arrangement operating in a direction parallel to the optical axis of said viewing tube; said slide being actuated by a micrometer screw.

Under the arrangement just described, the visual axis of the eye is brought into coincidence with the optical axis of the viewing tube, after which the viewing tube, (together with the microscope), is moved along its optical axis to a position where the ring of white light seen between the two sights appear as a perfect circle during as great an angular excursion as possible.

The microscope is next moved independently of the viewing tube, in a direction parallel to the optical axis of the viewing tube to the position where the hair or wire of the eye piece is tangent to the image of the corneal vertex.

Means are thus provided for accurately measuring the separation between the corneal vertex and a fixed point within the instrument, preferably the centre of generation of the arc segment. As said arc segment centre lies upon the axis of said pinion, a projection of said pinion axis through the eye under test clearly shows that we have provided means for accurately measuring the position of the corneal vertex relative to the plane of the arc segment centre at any and all instants during a series of tests. From the data thus secured, the position of the centre of motion is determined for relatively small angular excursions of the eye from the normal or straight forward position as well as the path of departure of the centre of motion from this position for gradually increasing angular excursions of the eye within the limits of the extreme angle of fixation.

It is a further object of the invention to provide means for securing the patient's head in a definite and fixed position during a series of tests so that the skull and therefore the eye socket will remain in an unvarying position during the procedure. It is a further object of the invention to so mount the viewing tube that it can be moved through a series of consecutive radial positions located within a common plane; to so arrange the device that the patient's head and its support can be shifted in order to cause said plane to include the visual axis of the eye under test; and to also make provision for advancing or receding the position of the viewing tube support with respect to the position of the eye under test so that the optical axis of the viewing tube can always be brought to a position where it coincides with the visual axis of the eye at that instant.

It is a further object of the invention to provide means whereby the plane in which the viewing tube describes its movements may be tilted in either direction with respect to the medial plane so as to establish the ecliptic in any desired angle. Having done so the viewing tube may be swung through different positions of test so that the eye can be tested for all or any desired positions in such plane of departure from the medial.

A further feature of the invention relates to the provision of means for correcting any error of refraction of the eye of the patient, such as myopia, hyperopia, or astigmatism in order that the visual acuity of the patient may be normal when viewing the sights within the viewing tube. This result is accomplished by placing at the end of the viewing tube adjacent to the patient, such lens or lenses from the usual test case as are necessary to correct any error of refraction of the patient's eye. In this connection, it is an object of the invention to so arrange the parts supporting said test lens or lenses that there shall be no change in the axial direction of a cylinder, used for the correction of astigmatism, such as would occur were this correcting cylinder fixedly placed in position, due to the rotation of the viewing tube in passing from the horizontal or medial plane to a plane of the ecliptic. This result is accomplished by the arrangement of parts supporting said test lens or lenses with a counter or balance weight so that the prescribed axis of a cylindrical test lens is always freely maintained irrespective of any rotation of the viewing tube about its axis.

Other objects are to provide an instrument of simplicity of arrangement and construction, an instrument of great ruggedness, and at the same time of such a nature that the principal optical parts may be very accurately supported, located, and adjusted.

Other objects are to provide means for observing the effect upon the eyeball, relative to its position in its socket, of forced or relaxed accommodation, brightness glare, change of intensity of illumination, the instillation of a mydriatic or a myotic, as well as other factors which may become evident during the tests.

Other objects and uses of the invention will appear from a detailed description of the same, which consists in the features of construction and combinations of parts hereinafter described and claimed.

In the drawings

Figure 3 shows a side elevation of the instrument looking at the same from the side which is exposed in Figure 1;

Figure 4 shows a fragmentary cross section on the line 4—4 of Figure 3, looking in the direction of the arrows;

Figure 7 shows a longitudinal section through the viewing tube on the axis thereof;

Figure 8 shows a perspective view of the viewing tube screen having indicated thereon the transparent or translucent ring of one monochromatic color;

Figure 9 shows a perspective view of the other viewing tube screen having indicated thereon the transparent or translucent spot of the other monochromatic color;

Figure 10 shows a fragmentary face view of the combined appearance of the screens as seen by the patient when the condition of coincidence of the optical axis of the viewing tube and the visual axis of the patient's eye is established;

Figure 11 shows a view similar to that of Figure 10, but illustrating a condition of lack of coincidence of said axes, so that the white band is eclipsed into a small moon shaped crescent;

Figure 12 shows a longitudinal section through the microscope for viewing the cornea of the eye under test from a position at right angles to the visual axis of the eye; and Figure 13 shows a view of the hair or wire of the microscope, showing the corneal vertex projected thereon in the correct position, that is, the hair or wire is tangent to the corneal vertex.

Figure 1:
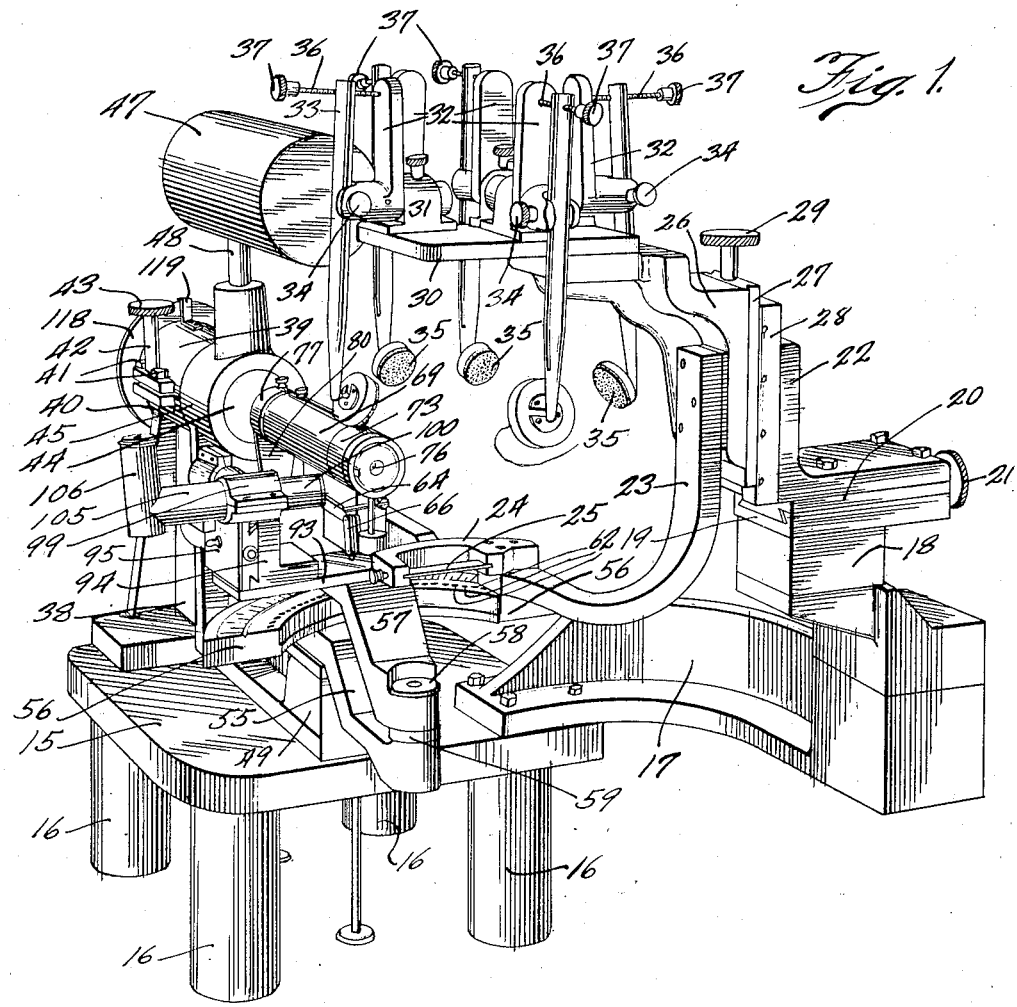
Figure 1 shows a perspective view of an instrument embodying the features of the present invention, looking at the same from the side which is occupied by the patient.
Figure 2:
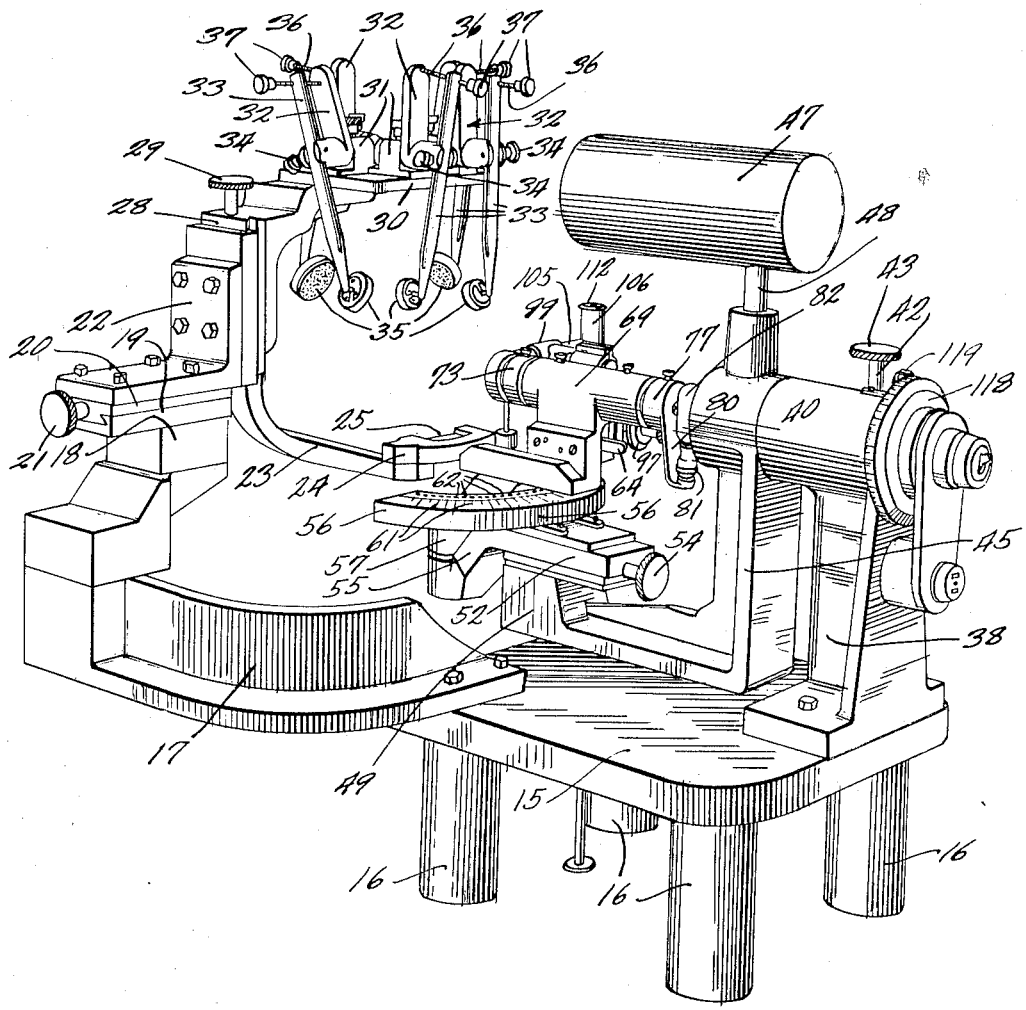
Figure 2 shows a view similar to that of Figure 1, but looking at the instrument from the opposite direction and towards the position occupied by the patient.

In the construction of the instrument illustrated, there is a base plate 15 provided with suitable legs or feet 16, by means of which it is conveniently supported on a table or other mounting. When viewing the instrument as in Figure 1, it is observed that there is a bracket 17, which curves to the right and rearward, said bracket being for the purpose of carrying a suitable head support. At its rear end, this bracket 17 is provided with a pedestal block 18 carrying a transversely extending angular connection 19 with a slide 20. This slide can be adjusted back and forth by means of a knurled head 21 in the usual manner. The slide carries a bracket 22 which carries a vertical angular connection 28 upon which the slide block 27 can be moved vertically by means of the knurled head 29 in the usual manner. Attached to the slide block 27 is the bracket 26 from which there extends downwardly and forwardly an arm 23 having at its end a yoke 24 across which extends a mouthpiece block or bit 25. The same can be taken firmly between the teeth of the patient and greatly assists in maintaining the patient's head in a fixed position.

The bracket 26 carries a horizontal plate 30, having mounted thereon a series of blocks 31; and pivotally connected to each of these blocks there is an L-shaped bracket 32 having a horizontal arm and a vertical arm. Each of the horizontal arms has pivotally connected to it a swinging rod 33 so that said rod can be swung back and forth on a horizontal axis at right angles to the pivotal connection to the block 31. The pivotal connections of these arms 33 are effected by means of fixed pins 34ª, and screws 34, engaging the grooves at opposite sides of the rods 33, the general arrangement being apparent from examination of Figures 3 and 4 in particular.

There is a pad block 35 pivotally connected to the lower end of each of the rods 33 by means of a ball and socket or similar joint so that each of these pads may come to an even and firm seat against the head of the patient. Preferably, there are two of the arms and pads in position to engage the patient's forehead, one in position to engage each side of the patient's head above the temple and one in position to engage the back of the patient's head. The elevations of the different arms with their pads can be readily adjusted individually so as to support the patient's head at the desired points.

There is a screw 36 threaded to the upper end of each of the arms 33 and having a knurled head 37 by means of which it may be turned. The inner end of each of these screws bears against the vertical arm of the corresponding bracket 32, thus providing means for swinging the arms so as to bring the respective pads into firm contact with the patient's head.

Extending upward from the plate or table 15 at the side distant from the patient, there is a bracket 38. This bracket carries at its upper end a split bearing having the upper and lower sections 39 and 40 respectively which are normally held together by means of the machine screws 41 to fit the rotatable bearing pin 44. A tightening screw 42 is also provided for tightening up this bearing, said screw 42 carrying a knurled wheel 43 on its upper end.

A bearing pin 44 is extended through this bearing in the direction towards the patient. An L-shaped bracket arm 45 is connected to the inner end of this pin 44 by means of a rivet pin 46, so that said bracket arm can swing through a wide arc about a horizontal axis coincident with the pin 44. This bracket 45 is counter-balanced by means of a weight 47 which reaches upwards from the bearing pin 44, in direct opposition to the bracket 45, being for this purpose carried by a pin 48.

The L-shaped bracket arm 45 carries at its lower and outer end a block 49. Mounted on and secured to this block 49 is a plate 50 which is slotted to receive the downwardly extending lug 51 of a slide 52. A screw 53 extends through the ends of the block 50 and through the lug 51, being fixed against longitudinal movement with respect to the block 50. This screw 53 is provided with a knurled head 54 by means of which it is easily turned so as to shift the slides back and forth. It will be noted that this back and forth movement is towards and from the patient.

Figure 6:
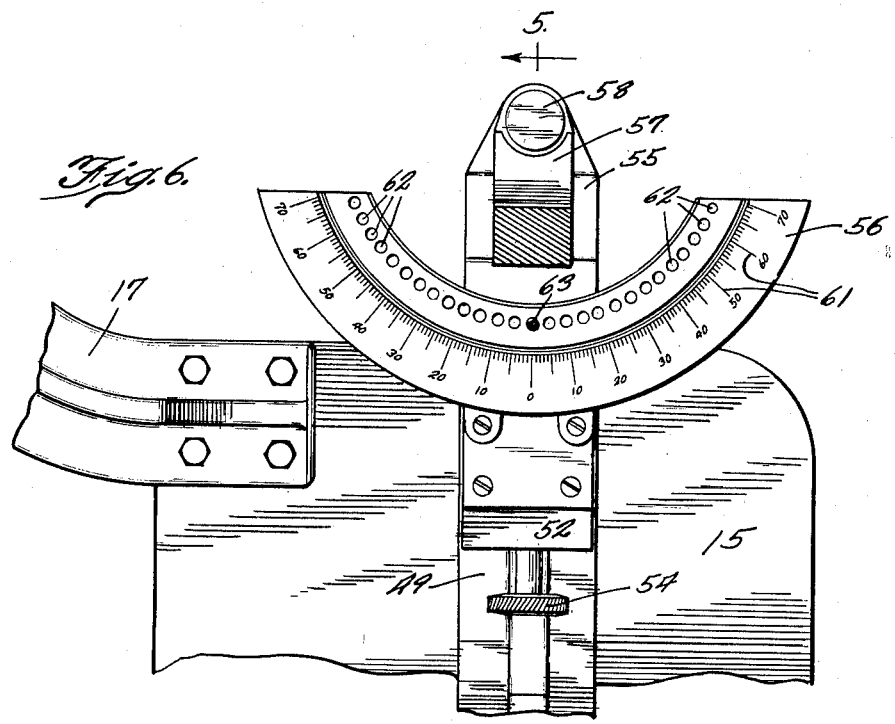
Figure 6 shows a plan view corresponding to Figure 5, being taken on the line 6—6, looking in the direction of the arrows.
Figure 5:
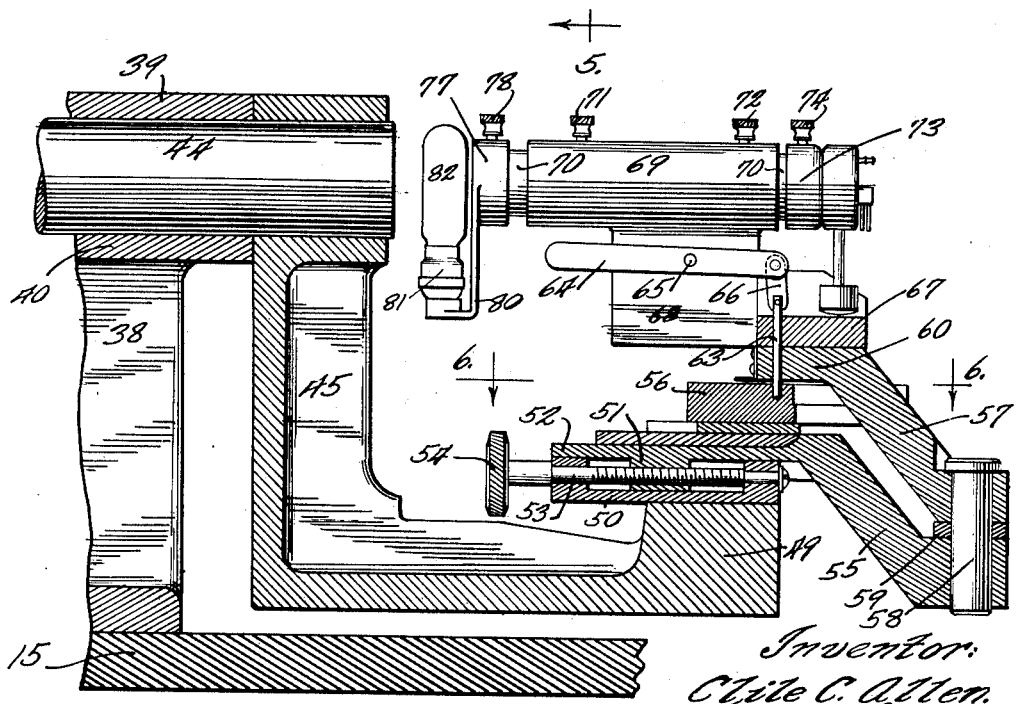
Figure 5 shows a fragmentary longitudinal section through the mounting and support for the viewing tube being taken on the line 5—5 of Figure 6, looking in the direction of the arrows.

At the inner end of the slide 52 there is a downwardly and forwardly extending bracket 55. Mounted upon the slide 52 there is an arc segment 56 which, as shown in Figure 6, extends through approximately 70 degrees of arc at each side of the center axis.

There is an arm 57, the inner end of which is pivotally connected to the inner end of the bracket 55, by means of the vertical pinion 58; and preferably an anti-friction washer 59 is located between the bracket 55 and arm 57. The upper end of the arm 57 extends rearwardly as shown at 60 and swings directly above the surface of the arc segment 56. The arc segment 56 is conveniently marked in degrees as shown by the scale markings 61 in Figure 6 in particular; and preferably also the arc segment 56 is provided with perforations or pin holes 62 at 5 degree positions. A vertical pin 63 works through the head portion 60 and will drop into any one of these holes as selected. A short lever arm 64 is provided with a pivotal connection 65 to an element carried by the head 60, a link 66 connecting the inner end of said lever to the pin 63. Thus this lever 64 serves as a convenient means for raising the pin 63 to disengage it from a hole of the arc segment 56 and allow the arm 57 and head 60 to be swung into a new position.

A block 67 is secured to the head 60 and has a rearwardly extending bracket 68. The upper end of this bracket 68 carries a sleeve 69 and a viewing tube 70 is extended through said sleeve. This viewing tube is secured within the sleeve by means of set screws 71 and 72 which permit the sleeve to be adjusted endwise as well as permitting rotational adjustments with respect to the sleeve 69.

At the inner end of the tube 70 there is mounted a cap 73, the same being held in place by means of a set screw 74. This cap 73 has a relatively small central orifice 75 located on the visual axis of the viewing tube, and a focusing lens 76 is placed across said orifice 75 at the patient's end thereof.

A cap 77 is mounted upon the other end of the tube 70, being secured in place thereon by means of a set screw 78. This cap 77 also has a central orifice 79 located on the axis of the tube 70. A bracket arm 80 is carried by the cap 77 and in turn carries a lamp socket 81 for a lamp 82 which serves to illuminate the sights 83 and 84.

Located within the tube 70, there are two transparent sights designated 83 and 84 respectively. Each of these is conveniently made of glass or the like and is mounted in a ring annulus 85, being clamped thereto by means of the separate threaded ring 86. Each of the rings 85 together with its sight is supported and centered within the tube 70 by means of a series of short threaded studs 87 located around the ring. By this arrangement, each ring with its sight can be shifted transversely of the tube 70 in order to bring said sights exactly to the optical axis of the viewing tube which lies upon the axis of the bearing pin 44.

The sight 83 is provided with a transparent colored annulus or ring 88 of red and the sight 84 is provided with a central transparent spot 89 of green. The spot 89 is of such size with respect to the central opening of the annulus 88 that when the sights 83 and 84 are viewed through the lens 76, the spot 89 does not quite fully obliterate or cover over the open central portion of said annulus or band 88, but there is left a narrow ring 90 between the red and green surfaces, said narrow ring 90 appearing as white when the spot 89 and annulus 88 are viewed from a position coincident with the optical axis of the system. This condition is illustrated in Figure 10. On the other hand, when the visual axis of the patient is not exactly coincident with the optical axis of the viewing tube, the spot 89 will appear off center with respect to the annulus 88 so that the narrow band 90 will be eclipsed and there will appear a moon shaped segment 91 of white light as indicated in Figure 11. The location of this moon shaped segment will advise the operator as to the direction in which a compensatory movement of the patient's head should be made.

Such compensatory movement of the patient's head is effected by means of the slide arrangements 20 and 27; since by turning the knurled heads 21 and 29, said slides can be shifted so as to move the patient's head slightly into position where the desired coincidence is produced. Having accomplished this result, the operator has brought the visual axis of the patient's eye into coincidence with the optical axis of the viewing tube. This is generally performed while the viewing tube is at the central position of the arc segment 56, corresponding to direct forward vision of the eye under test.

In order to improve the accuracy of the indication of coincidence or lack of coincidence of the axes it is preferred that the transparent annulus 88 and the transparent spot 89 should be of monochromatic colors and truly complementary to each other. Under these conditions, secured for example by the red and green complementary shades, there is produced a maximum of contrast as between said colors and the intervening white band and crescent already referred to. Furthermore, under these conditions, the overlapping of the annulus and spot at the side opposite to the white crescent 91 results in the production of a complementary black crescent 92 at the side opposite the white crescent since the two complementary colors when superimposed will absorb all light at the position of overlap.

Having made the adjustments so far explained with the swinging arm 57 located above the center of the arc segment 56 for direct forward vision, the operator may then release the arm 57 by raising the pin 63 and the viewing tube may be swung to one side or the other from the central position. Upon doing so, the visual axis of the eye will maintain coincidence with the optical axis of the viewing tube provided the axis of swing (which is the center of the arc segment 56) intersects the visual axis of the eye turning to follow this changing position of the viewing tube. On the contrary, if the axis of swing of the viewing tube does not intersect the visual axis of the eye there will be a progressively increasing departure from such intersection of the axes as the viewing tube is turned farther and farther in the one direction or the other, and this departure from intersection will be evidenced to the patient by the eclipsing of the white ring 90 at the one side or the other depending on whether the axis of swing of the viewing tube is anterior or posterior to the point at which it intersects the visual axis of the eye at that instant.

The operator may shift the bracket arm 55 back and forth towards and from the patient by proper manipulation of the knurled head 54 and thus by experimentation can bring the axis of swing of the viewing tube into exact intersection with the visual axis. Such coincidence will be evidenced by the fact that the narrow ring 90 of white light 90 will remain uneclipsed as the viewing tube is swung back and forth through reasonable ranges of movement.

Preferably the lens 76 should be of such focal length as to bring white light to focus at a point between the sights 83 and 84, and by designing the lens 76 with a longitudinal color aberration equal to the separation of the sights 83 and 84, it is possible to bring the monochromatic red light to focus at the position of the sight 83 and simultaneously bring the monochromatic green light to focus at the position of the sight 84. This will give a maximum of sharpness and accuracy to the system when viewed by the patient.

There is a bracket arm 93 which reaches sidewise from the head 60 of block 67, and carries at its outer end a bracket 94. A slide block 95 is slidably connected to the bracket 94 so that it can be shifted back and forth parallel to the optical axis of the viewing tube and therefore parallel to the visual axis of the patient. A screw arrangement including a screw pin 96 and a graduated micrometer wheel 97 thereof provides a convenient means for adjusting the slide block 95 back and forth parallel to the optical axis already referred to. This micrometer wheel 97 may be read in comparison to a scale 98 mounted adjacent thereto so that the exact amount of back and forth adjustment of the slide block 95 can be readily ascertained.

The slide block 95 carries a split sleeve 99 extending through which is a microscope tube 100. Suitable screws or the like may be provided for clamping this sleeve to the tube. The inner end of the microscope tube carries a lens system 101. The other end of said tube also carries a lens 102 and a hair 103 is stretched across the optical axis of the microscope in advance of the lens 102.

An L-shaped tube has an arm 105 mounted on the microscope tube 100 and another right angular arm 106 connected thereto by means of a conjunction box 107. A prism 108 is placed in said junction box and serves to deflect the optical axis at right angles to the arm 106. If desired, the tube 100 may be provided with an encircling groove 109 which is engaged by a pin 110 of the tube 105, thus permitting said tube to be turned around but preventing it from being pulled off of the microscope tube 100.

A short tubular section 111 is mounted within the arm 106 and carries at its outer end an eye lens 113 in cap 112. The tube 111 is provided with a curved slot 114 which is engaged by a pin 115 of the tube 106. Thus by turning the tube parallel it is either advanced or retracted so as to bring the eye lens 113 into focus on the hair according to the need of the eye of the observer.

The microscope above described is so positioned that the corneal vertex of the patient's eye under test can be brought to focus in this microscope whereupon the cornea shown at 116 in Figure 13 will appear in comparison to the hair 103. In Figure 13, the hair 103 is shown as being tangent to the corneal vertex.

With the above arrangement, the operator looking through the microscope can so adjust the micrometer screw 96 as to bring the hair 103 into tangency with the corneal vertex while the patient is looking straight ahead. Then, as the viewing tube is swung to a different angular position, and the patient's eye follows said viewing tube, the back and forth movements of the eye will be evidenced by changes of the position of the cornea 116 with respect to the hair 103 and the exact position of the corneal vertex may be noted corresponding to each angular position of the line of sight. In this way the relationship between the various factors in the movements of the eye can be ascertained.

The bracket arm 45 can be swung to one side or the other of the direct vertical position by loosening up the knurled head 43 as already explained. A micrometer wheel 118 is connected to the bearing pin 44, and a pointer 119 indicates on said scale of 118 the angular position of the bearing pin 44 with respect to the vertical position of the arm 45. When the arm 45 depends straight down the arc segment 56 will lie in a horizontal plane and the arm 57, together with the viewing tube and microscope, will swing in a horizontal or medial plane. On the other hand, it is possible to turn the arm 45 any desired amount away from the vertical position, whereupon the arc segment 56 will lie in a new plane or ecliptic. The knurled wheel 43 may then be tightened up and a series of tests can be run under these conditions. As the viewing tube is swung back and forth under these test conditions, there will be procured test results for movements of the eye in a plane lying at a definite angle with respect to the horizontal or medial plane. Similar tests may be run for different angles of planes, so that the movement of the eye ball under practically all conditions may be investigated. In each case, the data secured will make it possible to ascertain the position of the imaginary center of motion of the eye ball for any given set of conditions.

While we have herein shown and described only certain features of our present invention, still we do not intend to limit ourselves thereto except as we may do so in the claims.

We claim:

1. In an eye testing instrument, the combination of means for securing the head of a patient, means for adjusting said securing means laterally and vertically, a viewing tube, an optical system in said viewing tube having an optical axis, said optical system including means for indicating to the patient a condition of coincidence or lack of coincidence of the visual axis of the patient's eye with respect to the optical axis of said viewing tube, means for supporting said viewing tube, including a pivotal support permitting swinging of said viewing tube about an axis, means for adjusting the position of said axis anteriorly and posteriorly with respect to the patient's eye, said supporting means including a horizontal axis permitting swinging of the first mentioned pivotal support with respect to the medial plane, a microscope, means for supporting the same with respect to said viewing tube and at right angles to the optical axis of the viewing tube, said microscope including means for securing tangency of the microscope axis with the corneal vertex, means for advancing and receding the position of the microscope in a direction parallel to the viewing tube, and means for indicating the position of the corneal vertex relative to the axis of said pivotal support, substantially as described.

2. In an eye testing instrument, the combination of means for securing the head of a patient, means for adjusting said securing means, a viewing tube, an optical system in said viewing tube having an optical axis, said optical system including means for indicating to the patient a condition of coincidence or lack or coincidence of the visual axis of the patient's eye with respect to the optical axis of said viewing tube system, means for supporting said viewing tube, including a pivotal support permitting swing of said viewing tube about an axis, means for adjusting the position of said viewing tube anteriorly and posteriorly with respect to the patient's eye, said supporting means including a horizontal axis permitting swinging of the first mentioned pivotal support with respect to the medial plane, a microscope, means for supporting the same with respect to said viewing tube and at right angles to the optical axis of the viewing tube, said microscope including means for comparison with the corneal vertex, means for advancing and receding the position of the microscope in a direction parallel to the viewing tube, substantially as described.

3. In an eye testing instrument, the combination of means for securing the head of a patient, a viewing tube, an optical system in said viewing tube having an optical axis, said optical system including means for indicating to the patient a condition of coincidence or lack of coincidence of the visual axis of the patient's eye with respect to the optical axis of the viewing tube system, means for supporting said viewing tube including a pivotal support permitting swing of said viewing tube about an axis, means for adjusting the position of said axis anteriorly and posteriorly with respect to the patient's eye, said supporting means including a vertical axis permitting swinging of the first mentioned pivotal support with respect to the medial plane, a microscope, means for supporting the same with respect to said viewing tube and at right angles to the optical axis of the viewing tube, said microscope including means for comparison with the corneal vertex, means for advancing and receding the position of the microscope in a direction parallel to the viewing tube, substantially as described.

4. In an eye testing instrument, the combination of means for securing the head of a patient, a viewing tube, an optical system in said viewing tube having an optical axis, said optical system including means for indicating to the patient a condition of coincidence or lack of coincidence of the visual axis of the patient's eye with respect to the optical axis of said viewing tube system, means for supporting said viewing tube including a pivotal support permitting swing of said viewing tube about an axis, means for adjusting the position of said axis anteriorly and posteriorly with respect to the patient's eye, a microscope, means for supporting the same with respect to said viewing tube and at right angles to the optical axis of the viewing tube, said microscope including means for comparison with the corneal vertex, and means for advancing and receding the position of the microscope in a direction parallel to the viewing tube, substantially as described.

5. In an eye testing instrument the combination of means for securing the head of a patient, a viewing tube in position having an optical system in position for examination by the eye of a patient, means for moving said viewing tube into different positions for inspection by the patient's eye at different angles with respect to the horizontal and vertical, means for indicating the angles of said inspection, a microscope, means for supporting the same with respect to said viewing tube and at right angles to the optical axis of inspection aforesaid, said microscope including means for comparison with the corneal vertex, and means for advancing and receding the position of the microscope in a direction parallel to the direction of inspection of the viewing tube, substantially as described.

6. In an eye testing instrument, the combination of means for securing the head of a patient, a viewing tube in position having an optical system in position for examination by the eye of a patient, means for moving said viewing tube into different positions for inspection by the patient's eye at different angles, means for indicating the angles of said inspection, a microscope, means for supporting the same with respect to said viewing tube and at right angles to the optical axis of inspection aforesaid, said microscope including means for comparison with the corneal vertex, and means for advancing and receding the position of the microscope in a direction parallel to the direction of inspection of the viewing tube, substantially as described.

7. In an eye testing instrument, the combination of means for securing the head of a patient, a viewing tube having an optical system in position for examination by the eye of a patient, means for moving said viewing tube into different positions for inspection by the patient's eye at different angles with respect to the horizontal, means for indicating the angles of said inspection, a microscope, means for supporting the same with respect to said viewing tube and at right angles to the optical axis of inspection aforesaid, said microscope including means for comparison with the corneal vertex, and means for advancing and receding the position of the microscope in a direction parallel to the direction of inspection of the viewing tube, substantially as described.

8. In an eye testing instrument, the combination of means for supporting the head of a patient, means for adjusting said supporting means laterally and vertically, means for indicating the direction of vision of the visual axis of the eye under test, and means for indicating the position of the corneal vertex corresponding thereto relative to a fixed point posterior to said corneal vertex, substantially as described.

9. In an eye testing instrument, the combination of means for supporting the head of a patient, means for indicating the direction of vision of the visual axis of the eye under test, and means for indicating the position of the corneal vertex corresponding thereto relative to a fixed point posterior to said corneal vertex, substantially as described.

10. In an eye testing instrument, the combination of means for supporting the head of a patient, means for indicating different consecutive axes of vision of the eye under test and lying within a given plane of test, and means for indicating the position of the corneal vertex corresponding to each of said positions relative to a fixed point posterior to said corneal vertex, substantially as described.

11. In an eye testing instrument, the combination of means for indicating different positions of the visual axis of an eye under test, and means for indicating the position of the corneal vertex corresponding to each of said positions relative to a fixed point posterior to said corneal vertex, substantially as described.

12. In an eye testing instrument, the combination of means for simultaneously indicating a position of the visual axis of an eye under test and the corresponding position of the corneal vertex relative to a fixed point posterior to said corneal vertex, substantially as described.

13. In an eye testing instrument, the combination of means for simultaneously indicating the direction of the visual axis of an eye under test and the position of the corneal vertex corresponding thereto relative to a fixed point posterior to said corneal vertex, together with means for procuring such simultaneous indications for different series of angular positions of the visual axis of the eye under test in different planes with respect to the horizontal, substantially as described.

14. In an eye testing instrument, the combination of means for simultaneously indicating the direction of the visual axis of an eye under test and the position of the corneal vertex corresponding thereto relative to a fixed point posterior to said corneal vertex, together with means for procuring such simultaneous indications for different series of angular positions of the visual axis of the eye under test, substantially as described.

CLILE C. ALLEN.
GEORGE E. PARK.